United States Patent
Li et al.

(10) Patent No.: US 12,552,228 B2
(45) Date of Patent: Feb. 17, 2026

(54) AIR VENT APPARATUS FOR VEHICLE AND VEHICLE EQUIPPED WITH THE SAME

(71) Applicants: HYUNDAI MOTOR COMPANY, Seoul (KR); Kia Corporation, Seoul (KR)

(72) Inventors: Ming Zhe Li, Shandong (CN); Miao Miao Zhang, Shandong (CN); Won Young Bae, Seoul (KR); Chun Lei Sang, Shandong (CN)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 474 days.

(21) Appl. No.: 18/099,440

(22) Filed: Jan. 20, 2023

(65) Prior Publication Data

US 2023/0249517 A1 Aug. 10, 2023

(30) Foreign Application Priority Data

Feb. 7, 2022 (CN) .......................... 202210120578.5

(51) Int. Cl.
B60H 1/00 (2006.01)
B60H 1/34 (2006.01)

(52) U.S. Cl.
CPC ....... B60H 1/00871 (2013.01); B60H 1/3421 (2013.01)

(58) Field of Classification Search
CPC .......................... B60H 1/3421; B60H 1/3428; B60H 1/00871; B60H 1/00985; B60H 2001/3471; B60H 2001/3464
See application file for complete search history.

(56) References Cited

U.S. PATENT DOCUMENTS

| | | | |
|---|---|---|---|
| 5,338,251 A * | 8/1994 | Matsumoto | B60H 1/00871 454/153 |
| 10,518,609 B2 | 12/2019 | Krolewski et al. | |
| 2015/0328958 A1* | 11/2015 | Winget, Jr. | B60H 1/00742 454/155 |
| 2017/0361683 A1* | 12/2017 | Brinas | B60H 1/3428 |

FOREIGN PATENT DOCUMENTS

| | | |
|---|---|---|
| KR | 10-2005-0048137 A | 5/2005 |
| KR | 10-1761162 B1 | 7/2017 |

\* cited by examiner

*Primary Examiner* — Steven B Mcallister
*Assistant Examiner* — Xiaoting Hu
(74) *Attorney, Agent, or Firm* — MORGAN, LEWIS & BOCKIUS LLP

(57) ABSTRACT

An air vent apparatus for a vehicle and a vehicle provided with the air vent apparatus includes: a controller mounted on a vehicle body; a mounting base mounted on the vehicle body and including a discharge port formed at a rear end portion of the mounting base; an air guide assembly mounted adjacent to the discharge port of the mounting base; and a drive assembly electrically connected to the controller and configured to drive the air guide assembly engaged to the drive assembly to rotate to a first position, a second position, or a third position under a control of the controller.

14 Claims, 23 Drawing Sheets

AIR VENT APPARATUS FOR VEHICLE AND VEHICLE EQUIPPED WITH THE SAME

CROSS-REFERENCE TO RELATED APPLICATION

The present application claims priority to Chinese Patent Application No. 202210120578.5 filed in the Chinese National Intellectual Property Administration on Feb. 7, 2022, the entire contents of which is incorporated herein for all purposes by this reference.

BACKGROUND OF THE PRESENT DISCLOSURE

Field of the Present Disclosure

The present disclosure relates to an air vent apparatus, and more particularly, to an air vent apparatus for a vehicle, and a vehicle provided with the air vent apparatus.

Description of Related Art

In a conventional air conditioner of a vehicle, when an air vent direction is adjusted, a wind direction is adjusted by manually flipping an air conditioner guide plate. The conventional air conditioner includes a single mode, and the operation thereof is inconvenient.

Therefore, the conventional air vent apparatus needs further improvement.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an air vent apparatus for a vehicle and a vehicle provided with the air vent apparatus having advantages of operating in a simple manner and improving user's experience by driving an air guide assembly to rotate to different positions by a drive assembly for providing various blowing modes.

Various aspects of the present disclosure are directed to providing an air vent apparatus for a vehicle. The air vent apparatus may include: a controller mounted on a vehicle body; a mounting base mounted on the vehicle body and including a discharge port formed at a rear end portion of the mounting base; an air guide assembly mounted adjacent to the discharge port of the mounting base; and a drive assembly electrically connected to the controller and configured to drive the air guide assembly engaged to the drive assembly to rotate to a first position, a second position, or a third position under a control of the controller. In the first position, the air guide assembly is controlled to guide wind of an air conditioner from the discharge port of the mounting base to a driver's seat of the vehicle, in the second position, the air guide assembly is controlled to guide the wind of the air conditioner from the discharge port of the mounting base to a rear seat of the vehicle, and in the third position, the air guide assembly is controlled to guide the wind of the air conditioner from the discharge port of the mounting base to a passenger seat of the vehicle.

The drive assembly may drive the air guide assembly to rotate to a fourth position under the control of the controller. In the fourth position, the air guide assembly may block the wind of the air conditioner from being discharged from the discharge port of the mounting base to an outside thereof.

The air vent apparatus may further include an air guide shell, wherein the air guide shell is provided with a mounting chamber and first and second air guide chambers, and the first and second air guide chambers are located on left and right sides of the mounting chamber, respectively.

The drive assembly may include: a driving member including an output shaft; a gear shaft including an upper end portion connected to the output shaft of the driving member; a first swing arm including a first end portion and a second end portion, wherein a first protruding shaft extending in an upward direction is mounted on an upper surface of the first end portion and is connected to a lower end portion of the gear shaft, and the first swing arm is rotatable about the first protruding shaft by driving of the gear shaft; a second swing arm including a second protruding shaft connected upwardly in a center portion of the second swing arm, wherein the second protruding shaft is connected to the second end portion of the first swing arm, and the second swing arm is rotatably about the first protruding shaft by driving of the first swing arm; and two third swing arms, each including a first end portion and a second end portion, wherein a third protruding shaft extending in the upward direction is mounted on an upper surface of each first end portion, each second end portion of each third swing arm is connected to a corresponding end portion of the second swing arm, and each third protruding shaft is connected to a lower end portion of the corresponding air guide assembly to drive the corresponding air guide assembly to rotate.

The air guide assemblies are set into two groups. Each group includes: a lower fixed rod and an upper fixed rod; a plurality of guide plates pivotably connected to the lower fixed rod and the upper fixed rod; and a guide plate connecting rod connected to the plurality of guide plates to synchronously rotate the plurality of guide plates. The third protruding shaft of each third swing arm is connected to one guide plate of the plurality of guide plates to drive the one guide plate to rotate, and the one guide plate drives remaining guide plates to be synchronously rotated through the guide plate connecting rod.

The drive assembly drives the air guide assembly to be fixed in any one of the first position, the second position, the third position, and the fourth position under the control of the controller.

The drive assembly drives the air guide assembly to cyclically swing among the first position, the second position, and the third position under the control of the controller.

The air vent apparatus further includes an input module, in which the input module is electrically connected to the controller, and is configured to receive manipulation information of a user and transmitting the manipulation information to the controller.

The air vent apparatus further includes a display module, in which the display module is electrically connected to the controller and displays a position of the air guide assembly.

Various aspects of the present disclosure are directed to providing a vehicle provided with the air vent apparatus for the vehicle according to the exemplary embodiment of the present disclosure.

The air vent apparatus for the vehicle of various aspects of the present disclosure are directed to providing various blowing modes, and is operated in a simple manner, and improves user's experience.

The method and apparatus of the present disclosure have other characteristics and advantages, and these characteristics and advantages will become apparent from the accompanying drawings and the following exemplary embodiments in the text, or will be described in detail in the drawings attached to the text and the exemplary embodiments to be described later, and both these drawings and exemplary embodiments are intended to interpret predetermined principles of the present disclosure.

Figure 1:
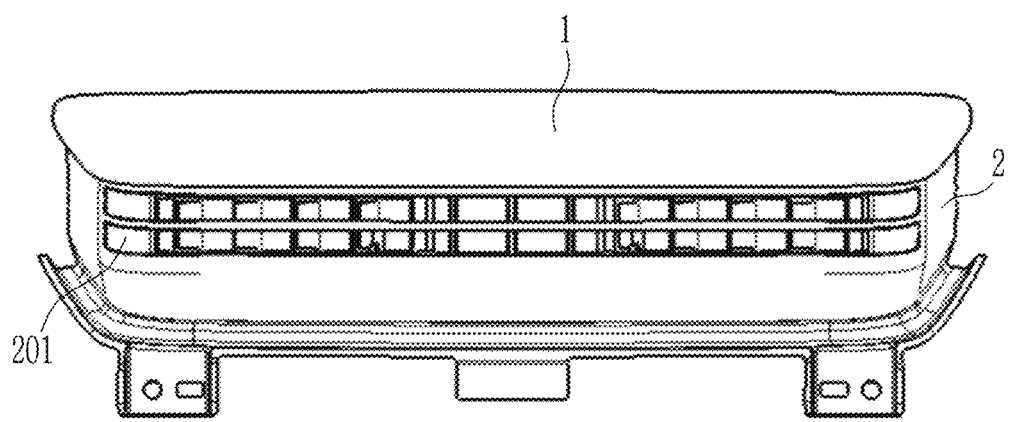
FIG. 1 is a schematic diagram illustrating a structure of an air vent apparatus for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Hereinafter, with reference to various exemplary embodiments of the present disclosure in detail, these exemplary embodiments will be described below by exemplifying the exemplary embodiments in the drawings. Although the present disclosure has been described in conjunction with exemplary embodiments of the present disclosure, it is to be understood that the present specification is not intended to limit the present disclosure to these exemplary embodiments of the present disclosure. To the contrary, the present disclosure not only includes these exemplary embodiments of the present disclosure, but also includes various alternatives, modifications, equivalents, and other exemplary embodiments within the scope of the spirit of the present disclosure and the appended claims.

Hereinafter, an air vent apparatus for a vehicle according to various exemplary embodiments of the present disclosure will be described by referring to FIGS. 1 to 23.

Figure 2:
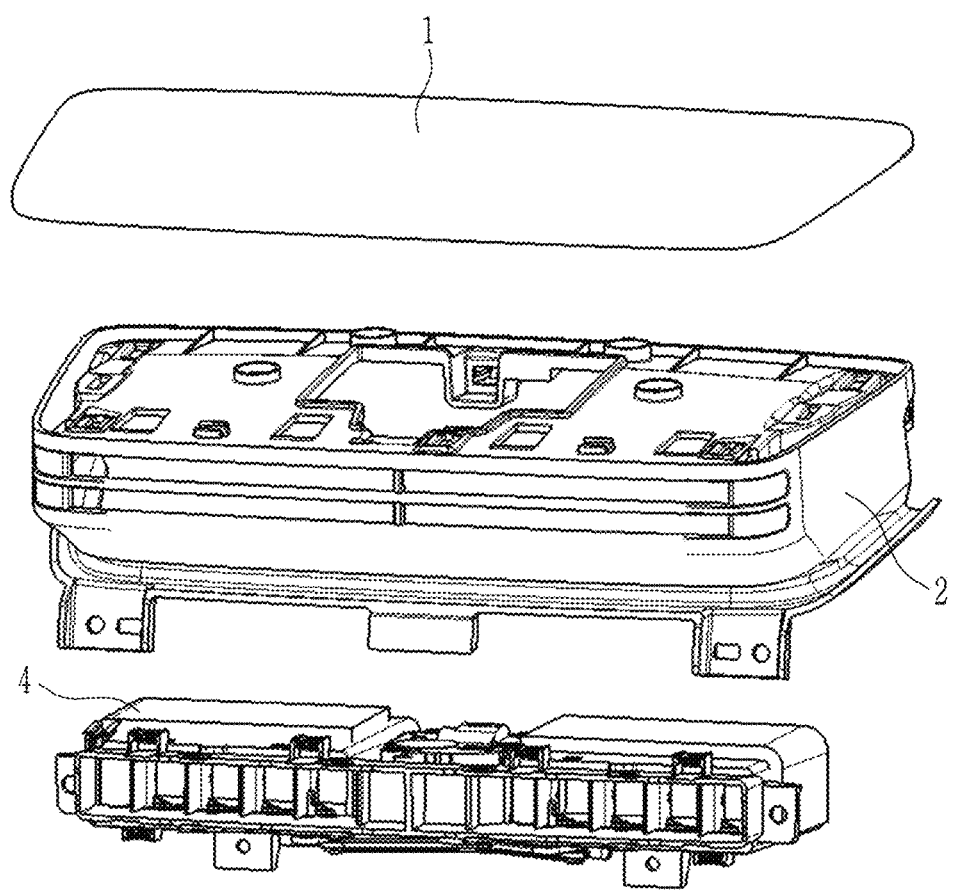
FIG. 2 is a perspective exploded view corresponding to FIG. 1.
Figure 3:
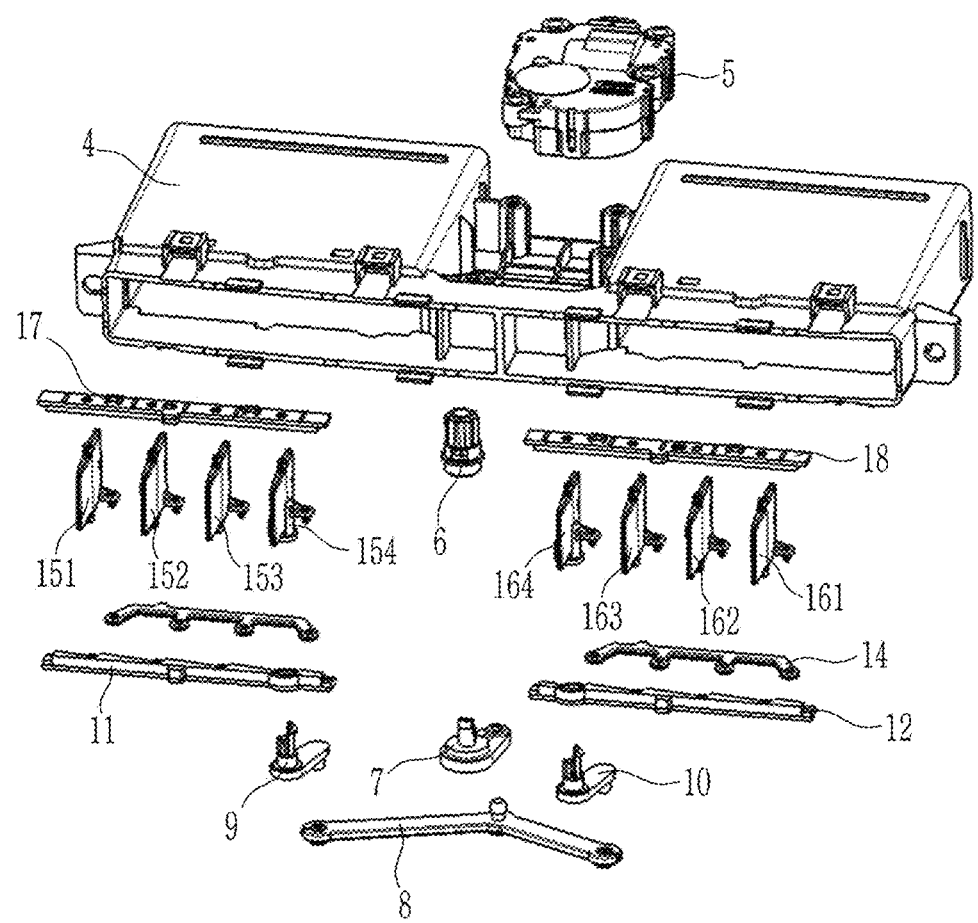
FIG. 3 is a perspective exploded view of an air guide assembly and a drive assembly corresponding to FIG. 2.

As illustrated in FIG. 1, FIG. 2, and FIG. 3, an air vent apparatus for a vehicle according to various exemplary embodiments of the present disclosure includes a controller, a mounting base 2, an air guide assembly, and a drive assembly. The controller and the mounting base 2 are mounted on a vehicle body, and a discharge port 201 is provided at a rear end portion of the mounting base 2. The air guide assembly is mounted adjacent to the discharge port 201 of the mounting base 2, the drive assembly is electrically connected to the controller and may drive the air guide assembly engaged to the drive assembly to rotate to a first position, a second position, and a third position under the control of the controller.

Figure 13:
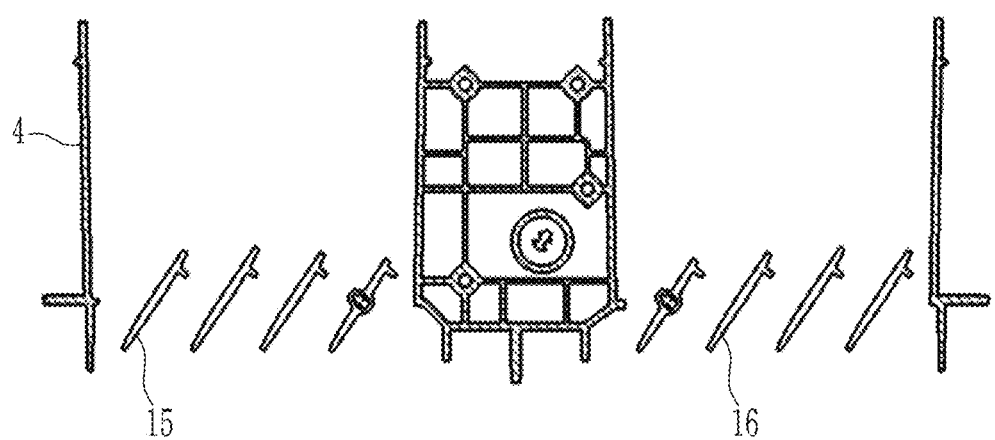
FIG. 13 is a schematic view exemplarily illustrating a state of a guide plate when an air guide assembly is in a first position.
Figure 23:
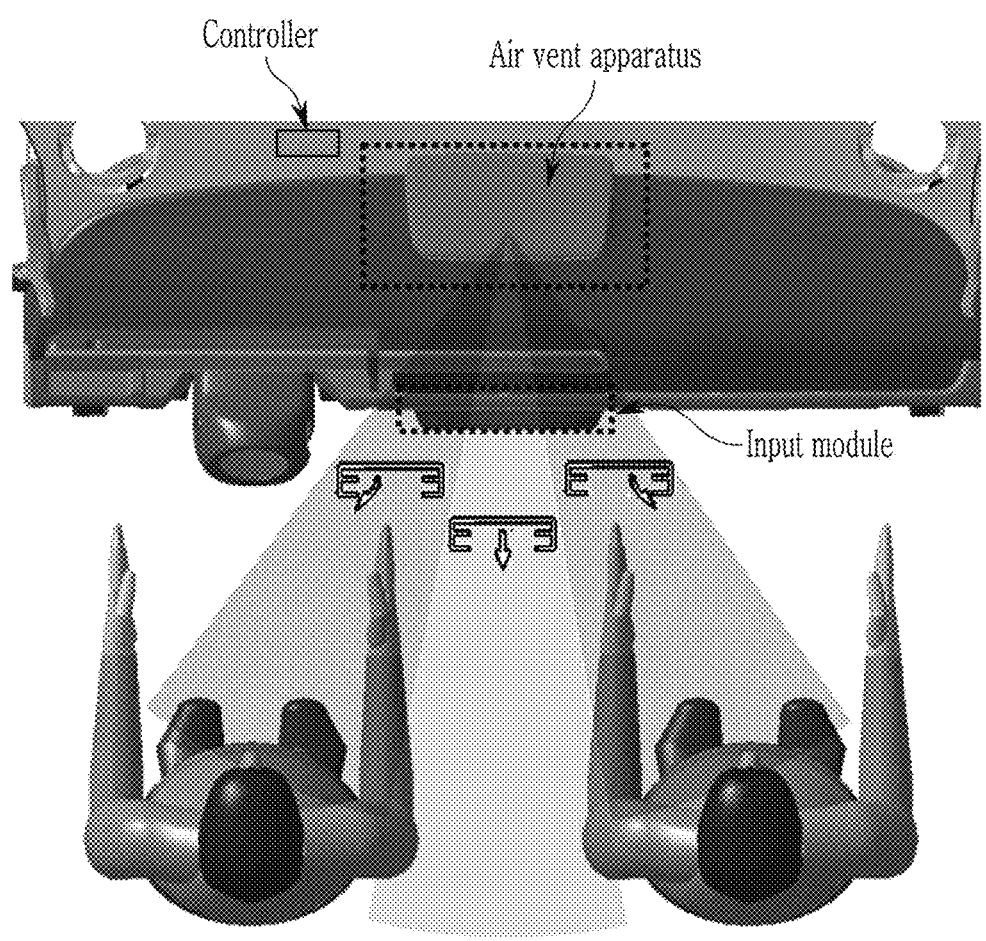
FIG. 23 is a diagram illustrating an approximate range that the wind discharged by an air vent apparatus covers when the air guide assembly is in a first position, a second position, and a third position.

In the first position, the air guide assembly may guide wind of the air conditioner from the discharge port 201 of the mounting base 2 to a driver's seat to provide the wind to the driver (see FIGS. 13 and 23).

Figure 14:
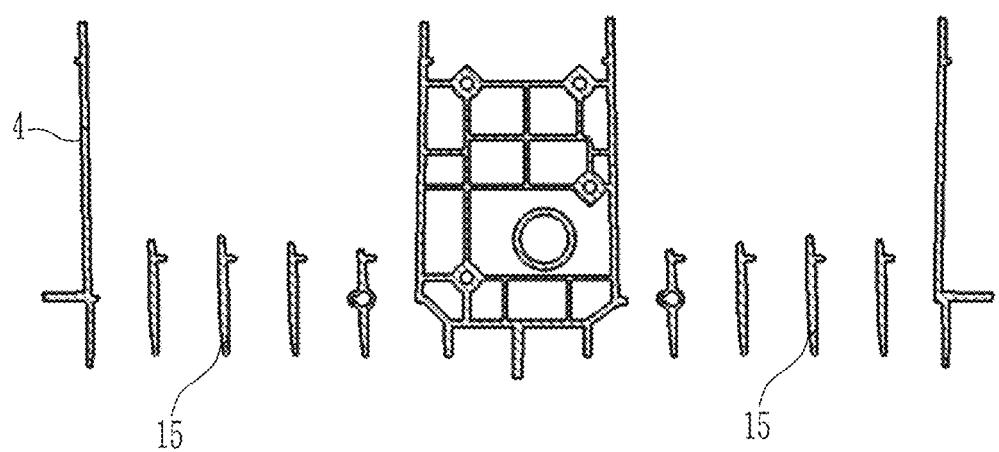
FIG. 14 is a schematic view exemplarily illustrating a state of a guide plate when an air guide assembly is in a second position.

In the second position, the air guide assembly may guide the wind of the air conditioner from the discharge port 201 of the mounting base 2 to a rear seat to provide the wind to passengers in all positions (see FIGS. 14 and 23).

Figure 15:
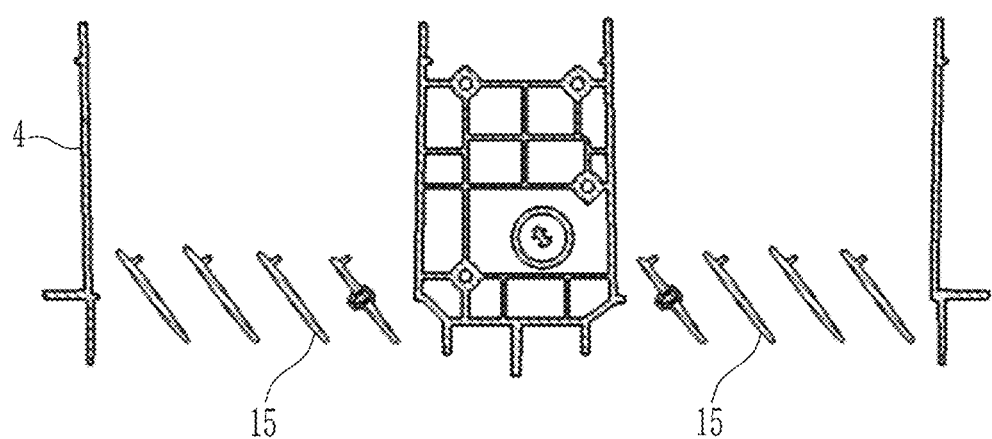
FIG. 15 is a schematic view exemplarily illustrating a state of a guide plate when an air guide assembly is in a third position.

In the third position, the air guide assembly may guide the wind of the air conditioner from the discharge port 201 of the mounting base 2 to a passenger seat to provide the wind to a passenger in the passenger seat (see FIGS. 15 and 23).

In an exemplary embodiment of the present disclosure, the drive assembly may drive the air guide assembly to rotate to a fourth position under the control of the controller.

Figure 16:
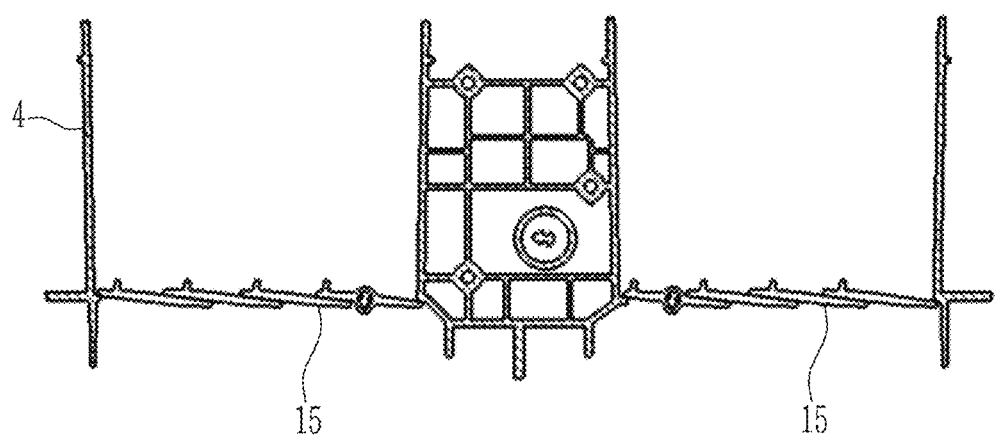
FIG. 16 is a schematic view exemplarily illustrating a state of a guide plate when an air guide assembly is in a fourth position.

In the fourth position, the air guide assembly may block the wind of the air conditioner from being discharged from the discharge port 201 of the mounting base 2 to the outside (see FIG. 16).

In an exemplary embodiment of the present disclosure, the mounting base 2 is mounted on a vehicle body, a front end portion of the mounting base 2 is connected to the air conditioner of the vehicle, and the discharge port 201 of the rear end portion of the mounting base 2 faces the rear of the vehicle.

Figure 17:
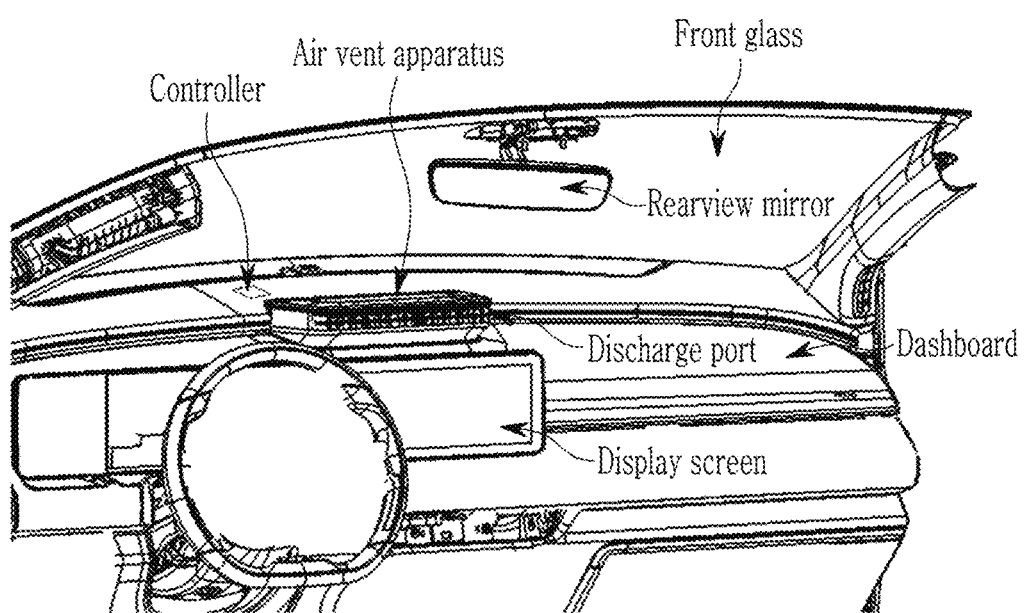
FIG. 17 is a schematic diagram illustrating a position of the air vent apparatus according to the exemplary embodiment of the present disclosure in a vehicle.

The discharge port 201 of the mounting base 2 is designed to be non-exposed, and a ventilation hole knob of an air conditioner in the related art is omitted, further simplifying an appearance of the mounting base 2 (see FIGS. 1 and 17).

The discharge port 201 is formed in a lattice shape, and includes two generally rectangular upper and lower openings.

It should be understood that the number of generally rectangular openings may be adjusted according to design needs.

In the exemplary embodiment of the present disclosure, an air guide shell 4 is mounted inside the mounting base 2, and openings are formed at both front and rear end portions of the air guide shell 4. The opening at the front end portion of the air guide shell 4 is connected to the air conditioner of the vehicle, the opening at the rear end portion of the air guide shell 4 is located adjacent to the discharge port 201 of the mounting base 2 and located slightly in front of the discharge port 201 of the mounting base 2, so that the air guide shell 4 guides the wind of the air conditioner to the discharge port 201 of the mounting base 2.

Figure 4:
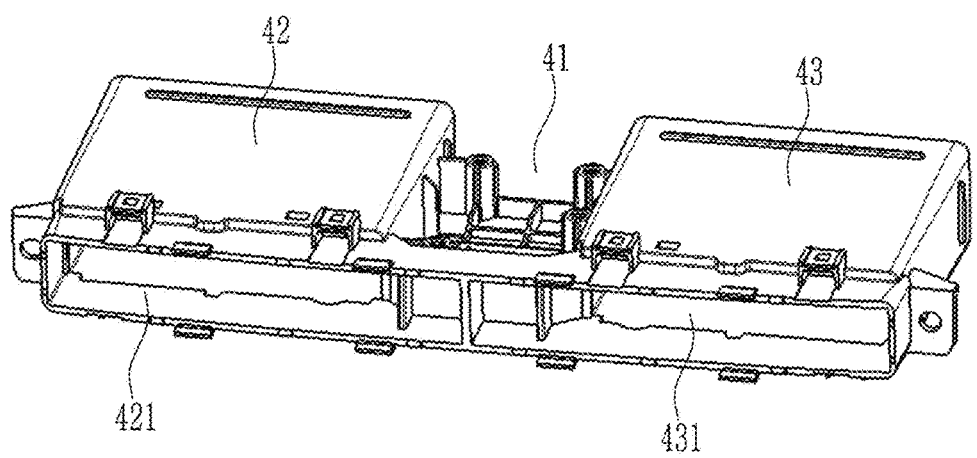
FIG. 4 is a schematic view exemplarily illustrating a structure of an air guide shell in FIG. 3.

In the exemplary embodiment of the present disclosure, as illustrated in FIG. 4, a mounting chamber 41 is provided in a middle portion of the air guide shell 4. The mounting chamber 41 is for mounting a driving member 5 of the drive assembly which will be described later.

In the exemplary embodiment of the present disclosure, as illustrated in FIG. 4, the air guide shell 4 includes an air guide chamber 42 and an air guide chamber 43 located on both left and right sides of the mounting chamber 41.

Openings are formed at both front and rear end portions of each of the air guide chamber 42 and the air guide chamber 43 to guide the wind of the air conditioner to the discharge port 201 of the mounting base 2. The opening 421 of the rear end portion of the air guide chamber 42 and the opening 431 of the rear end portion of the air guide chamber 43 are located slightly in front of the discharge port 201 of the mounting base 2 (see FIGS. 4 and 11), and both the opening 421 of the rear end portion of the air guide chamber 42 and the opening 431 of the rear end portion of the air guide chamber 43 are for mounting the air guide assembly.

Figure 11:
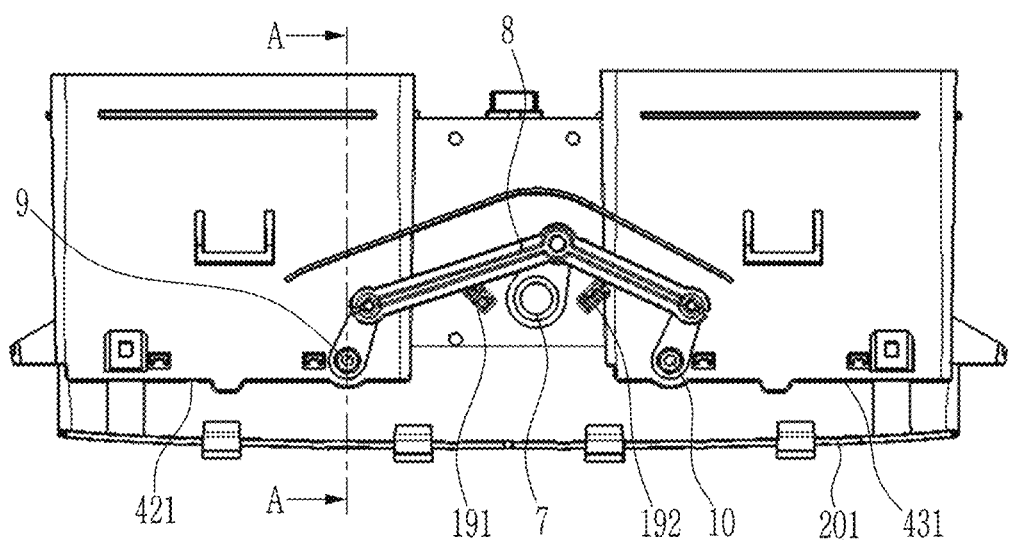
FIG. 11 is a schematic diagram illustrating a connection of a first swing arm, a second swing arm, and a third swing arm.

In an exemplary embodiment of the present disclosure, a position limiting boss 191 and a position limiting boss 192 are provided on a lower surface of a bottom plate of the mounting chamber 41 of the air guide shell 4 (see FIG. 11)

In an exemplary embodiment of the present disclosure, the bottom plate of the mounting chamber 41 of the air guide shell 4 is provided with a through hole.

In an exemplary embodiment of the present disclosure, a bottom plate of the air guide chamber 42 and a bottom plate of the air guide chamber 43 are each provided with a through hole.

In an exemplary embodiment of the present disclosure, the drive assembly includes the driving member 5, a gear shaft 6, a first swing arm 7, a second swing arm 8, and two third swing arms, and the two third swing arms are a third swing arm 9 and a third swing arm 10.

The gear shaft 6 is rotatably mounted on the bottom plate of the mounting chamber 41, and an output shaft of the driving member 5 passes through the through hole on the bottom plate of the mounting chamber 41 and then is connected to an upper end portion of the gear shaft 6, and the gear shaft 6 rotates about a straight line on which the gear shaft 6 is located by the driving of the driving member 5.

Figure 5:
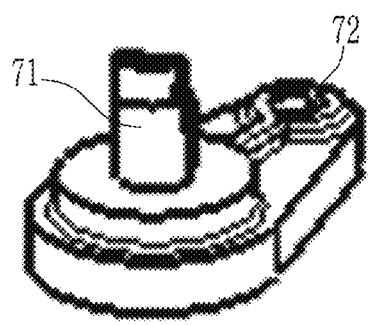
FIG. 5 is a schematic diagram illustrating a structure of a first swing arm in FIG. 3.

As illustrated in FIG. 5, a first protruding shaft 71 extending in an upward direction is provided on an upper surface of a first end portion of the first swing arm 7, the first protruding shaft 71 is connected to a lower end portion of the gear shaft 6, and the first swing arm 7 is rotated about the first protruding shaft 71 by driving of the gear shaft 6. A second end portion of the first swing arm 7 is provided with a mounting hole 72 penetrating in a vertical direction to be connected to the second swing arm 8.

A width of the first end portion of the first swing arm 7 is greater than a width of the second end portion of the first swing arm 7. When the driving member 5 rotates, the load applied to the first end portion of the first swing arm 7 is large. Furthermore, the first protruding shaft 71 of the first end portion of the first swing arm 7 needs to be engaged with the gear shaft 6, and if the size of the first swing arm 7 is too small, it may affect a molding of the first protruding shaft 71. Therefore, the width of the first end portion of the first swing arm 7 is set to be greater than the width of the second end portion of the first swing arm 7.

Figure 6:
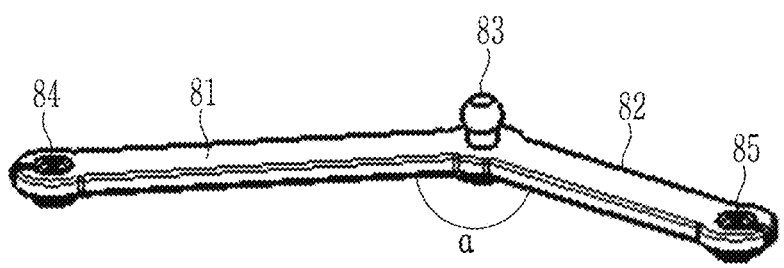
FIG. 6 is a schematic diagram illustrating a structure of a second swing arm in FIG. 3.

As illustrated in FIG. 6, the second swing arm 8 includes a first connection portion 81 and a second connection portion 82 which are integrally formed. The first connection portion 81 and the second connection portion 82 are located in front of the position limiting boss 191 and the position limiting boss 192 of the air guide shell 4, respectively, so that the position limiting boss 191 and the position limiting boss 192 may limit rotation angles of the first swing arm 7 and the second swing arm 8 (see FIG. 11).

A middle portion of the second swing arm 8 (that is, a connection portion of the first connection portion 81 and the second connection portion 82) includes a second protruding shaft 83 extending in the upward direction, the second protruding shaft 83 is connected to the mounting hole 72 of the second end portion of the first swing arm 7, so that the second end portion of the first swing arm 7 may be driven to rotate the second swing arm 8 about the first end portion of the first swing arm 7. A mounting hole 84 and a mounting hole 85 are formed respectively at both end portions of the second swing arm 8, so that the third swing arm 9 and the third swing arm 10 are connected to the mounting hole 84 and the mounting hole 85, respectively.

A straight line on which the first connection portion 81 is positioned and a straight line on which the second connection portion 82 is positioned form a constant included angle α (see FIG. 6), and the included angle α is an obtuse angle. A length of the first connection portion 81 is greater than a length of the second connection portion 82, so that the third swing arm 9 and the third swing arm 10 are driven to rotate the corresponding air guide assemblies at a same angle, respectively.

Figure 7:
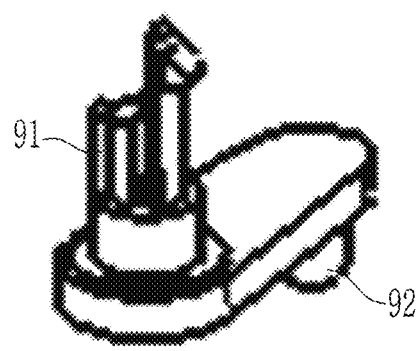
FIG. 7 is a schematic diagram illustrating a structure of a third swing arm located on the left side in FIG. 3.

As illustrated in FIG. 7, a third protruding shaft 91 extending in the upward direction is provided on an upper surface of a first end portion of the third swing arm 9, and the third protruding shaft 91 is connected to a lower end portion of the air guide assembly after passing through the through hole of the air guide chamber 42 in the upward direction thereof. A fourth protruding shaft 92 extending in a downward direction is provided on a lower surface of a second end portion of the third swing arm 9, and the fourth protruding shaft 92 is connected to the mounting hole 84 of the second swing arm 8.

A width of the first end portion of the third swing arm 9 is greater than a width of the second end portion of the third swing arm 9. This is because the first end portion of the third swing arm 9 should be connected to the air guide assembly, and thus applied load is large. If the size of the first end portion of the third swing arm 9 is too small, the molding of the protruding shaft 91 may be affected. Therefore, the width of the first end portion of the third swing arm 9 is set to be greater than the width of the second end portion of the third swing arm 9.

Figure 8:
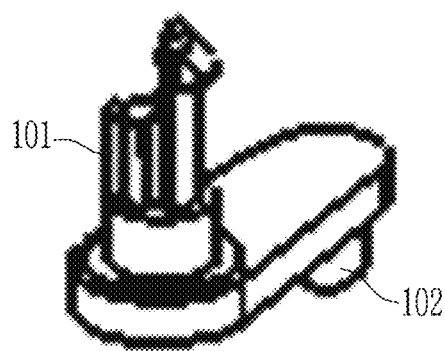
FIG. 8 is a schematic diagram illustrating a structure of a third swing arm located on the right side in FIG. 3.

As illustrated in FIG. 8, the third protruding shaft 101 extending in the upward direction is provided on the upper surface of the first end portion of the third swing arm 10, and the third protruding shaft 101 passes through the through hole of the air guide chamber 43 in the downward direction and then is connected to the lower end portion of the air guide assembly. A fourth protruding shaft 102 extending in the downward direction is provided on the lower surface of the second end portion of the third swing arm 10, and the fourth protruding shaft 102 is connected to the mounting hole 85 of the second swing arm 8.

Under the control of the controller, the driving member 5 rotates the gear shaft 6, and the gear shaft 6 rotates the first swing arm 7 to rotate the second swing arm 8. The second swing arm 8 rotates about a straight line on which the first protruding shaft 71 is located, and at the same time, the third swing arm 9 and the third swing arm 10 rotate about straight lines on which the third protruding shafts 91 and 101 are positioned, respectively.

In the exemplary embodiment of the present disclosure, the air guide assemblies are divided into two groups. The first group includes a lower fixed rod 11, an upper fixed rod 17, a guide plate connecting rod 13, and four guide plates 15, and the four guide plates 15 are a guide plate 151, a guide plate 152, a guide plate 153, and a guide plate 154 sequentially from the left to the right.

The lower fixed rod 11 and the upper fixed rod 17 are respectively mounted on a lower surface and an upper surface of an internal side of an outlet of the rear end portion of the air guide chamber 42. The four guide plates 15 are pivotably mounted on the lower fixed rod 11 and the upper fixed rod 17, and may be connected to each other through the guide connecting rod 13.

Four corresponding mounting holes are provided in each of the lower fixed rod 11 and the upper fixed rod 17, and the mounting hole adjacent to the mounting chamber 41 of the lower fixed rod 11 is formed as a through hole and corresponds to the through hole of the air guide chamber 42.

Figure 10:
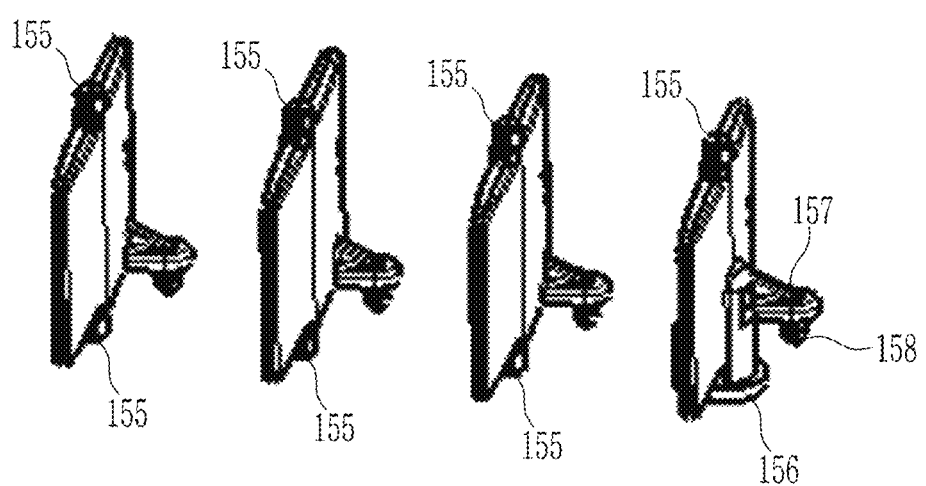
FIG. 10 is a schematic diagram illustrating a structure of a guide plate.

As illustrated in FIG. 10, fifth protruding shafts 155 are provided in a top portion and a bottom portion of each of the guide plate 151, the guide plate 152, and the guide plate 153, to be mounted in the corresponding mounting holes of the lower fixed rod 11 and the upper fixed rod 17. The fifth protruding shaft 155 is provided at the upper end portion of the guide plate 154, and a mounting groove 156 is provided at the lower end portion of the guide plate 154, the fifth protruding shaft 155 of the upper end portion of the guide plate 154 is mounted in the corresponding mounting hole of the upper fixing rod 17, and the mounting groove 156 at the lower end portion of the guide plate 154 corresponds to the through hole on the lower fixing rod 11.

A first extension portion 157 is provided on one side of each of the guide plate 151, the guide plate 152, the guide plate 153, and the guide plate 154, and a boss 158 extending in the downward direction is provided in each first extension portion 157.

Figure 9:
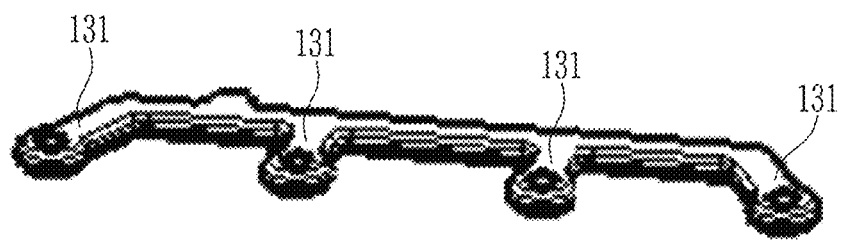
FIG. 9 is a schematic diagram illustrating a structure of a guide plate connecting rod located on the left side in FIG. 3.

As illustrated in FIG. 9, four second extension portions 131 are provided on one side of the guide connecting rod 13, and a connection hole is formed in each of the four second extension portion 131. The boss 158 of each of the guide plate 151, the guide plate 152, the guide plate 153, and the guide plate 154, is inserted into the connection hole of the second extension portion 131 of each guide connection rod 13, so that synchronous rotation of the four guide plates is implemented.

Figure 12:
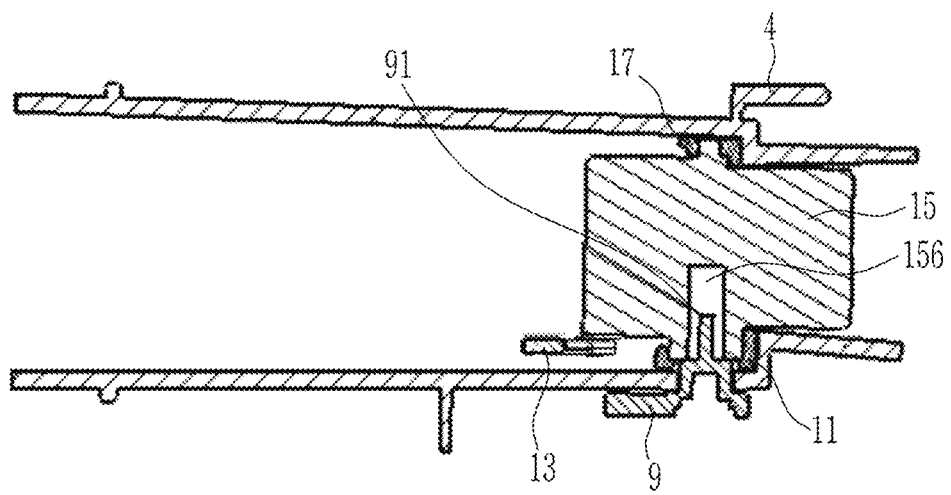
FIG. 12 is a schematic cross-sectional view taken along a line A-A in FIG. 11.

The third protruding shaft 91 of the third swing arm 9 sequentially passes through the through hole of the bottom plate of the air guide chamber 42 and the through hole of the lower fixed rod 11, and then is connected to the mounting hole 156 at the bottom plate of the guide plate 154 (see FIG. 12).

By driving of the second swing arm 8, the third swing arm 9 drives to rotate the guide plate 154. The guide plate 154 drives to rotate the guide plate 151, the guide plate 152, and the guide plate 153 through the guide plate connecting rod 13, implementing the synchronous rotation of the four guide plates.

When the guide plate 151, the guide plate 152, the guide plate 153, and the guide plate 154 are synchronously rotated by different angles, it is possible to guide the wind of the air conditioner to different positions or block the wind of the air conditioner from being discharged from the air guide chamber 42 to the outside.

When the four guide plates are rotated to the position illustrated in FIG. 13 (that is, the first position), the guide plate may guide the wind of the air conditioner from the discharge port 201 of the mounting base 2 to the driver's seat, and the wind of the air conditioner may cover up to a left shoulder region of the driver's seat.

When the four guide plates are rotated to the position illustrated in FIG. 14 (that is, the second position), the guide plate may guide the wind of the air conditioner from the discharge port 201 of the mounting base 2 to the rear seat, and the wind of the air conditioner may be blown up to the rear seat, providing a breeze to passengers in all positions.

When the four guide plates are rotated to the position illustrated in FIG. 15 (that is, the third position), the guide plate may guide the wind of the air conditioner from the discharge port 201 of the mounting base 2 to the passenger seat, and the wind of the air conditioner may cover up to a right shoulder region of the passenger seat.

When the fourth guide plate are rotated to the position (the fourth position) illustrated in FIG. 16, the guide plate may block the air conditioner wind from being discharged from the air guide chamber 42 to the outside.

The second group of the air guide assembly includes a lower fixed rod 12, an upper fixed rod 18, a guide plate connecting rod 14, and four guide plates 16, and the four guide plates 16 are a guide plate 161, a guide plate 162, a guide plate 163, and a guide plate 164 sequentially from the right to the left. The connection relationship and operation principle of the second group of the air guide assembly are the same as the connection relationship and operation principle of the first group of the air guide assembly, and thus a detailed description thereof will be omitted.

The first group of the air guide assembly and the second group of the air guide assembly are respectively connected to the third swing arm 9 and the third swing arm 10 so that the first group of the air guide assembly and the second group of the air guide assembly can rotate.

Under the control of the controller, the driving member 5 rotates the gear shaft 6, and the gear shaft 6 rotates the first swing arm 7 to rotate the second swing arm 8. The second swing arm 8 rotates about the straight line on which the first protruding shaft 71 is located, and at the same time, rotates the third swing arm 9 and the third swing arm 10 together so that the third swing arm 9 and the third swing arm 10 can rotate the corresponding air guide assemblies to the first position, the second position, the third position, and the fourth position thereof.

The number of guide plates in each group of the air guide assembly may be adjusted according to actual design needs.

Under the control of the controller, the air guide assembly may be operated in several modes, such as a direct blowing mode, a circulation mode, and a fixed mode, and each mode is specifically as follows.

Direct Blowing Mode: After the air vent apparatus is operated, the air guide assembly is positioned in the second position to guide the wind to the rear seats, providing a breeze to the passengers in all positions.

Circulation mode: Under the control of the controller, the output shaft of the driving member 5 rotates by a predetermined number of revolutions along a first direction, so that the air guide assembly may be rotated to the first position thereof. Accordingly, when the output shaft of the driving member 5 rotates by the predetermined number of revolutions along a second direction, the air guide assembly is rotated from the first position sequentially to the second position and the third position thereof. After the air guide assembly is rotated to the third position, the driving member is rotated again along the first direction by the predetermined number of revolutions to drive the air guide assembly to be rotated sequentially to the second position and the first position in order. A mode in which the air guide assembly reciprocately rotates in the manner described above is the circulation mode.

Fixed mode: When the air guide assembly is in the fixed mode, the driving member 5 no longer outputs power under the control of the controller, and the air guide assembly does not rotate and is fixed in the first position, the second position or the third position thereof.

For example, when the air guide assembly rotates to the first position, the driving member 5 no longer outputs the power under the control of the controller, whereby the air guide assembly is fixed in the first position thereof.

When the air guide assembly rotates to the second position, the driving member 5 no longer outputs the power under the control of the controller, whereby the air guide assembly is fixed in the second position thereof.

When the air guide assembly rotates to the third position, the driving member 5 no longer outputs the power under the control of the controller, whereby the air guide assembly is fixed in the third position thereof.

In the exemplary embodiment of the present disclosure, the driving member 5 drives the air guide assembly to rotate to the fourth position under the control of the controller, and no longer outputs the power after the air guide assembly rotates to the fourth position thereof. Accordingly, the air guide assembly is fixed in the fourth position thereof.

Figure 18:
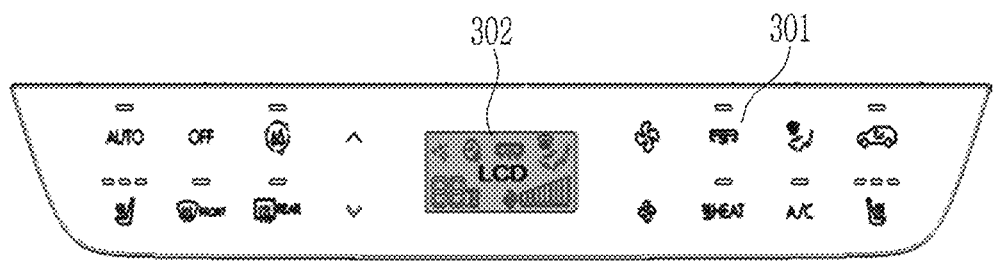
FIG. 18 is a schematic diagram of a center console of a vehicle provided by various exemplary embodiments of the present disclosure, and illustrates positions of a display module and an input module.

As illustrated in FIG. 18, the air vent apparatus for the vehicle according to the exemplary embodiment of the present disclosure further includes an input module 301. The input module 301 is provided at or adjacent to a center console, and the input module 301 is electrically connected to the controller. The input module 301 may receive manipulation information of the user and transmit the manipulation information to the controller.

In the exemplary embodiment of the present disclosure, after the air vent apparatus starts to operate, the air vent apparatus enters the direct blowing mode.

When the input module 301 detects a first manipulation of the user, the air vent apparatus enters the circulation mode.

When the input module 301 detects a second manipulation of the user, the air vent apparatus enters the fixed mode.

When the input module 301 detects a third manipulation of the user, the air vent apparatus is turned off, and the air guide assembly may block the wind of the air conditioner from being discharged from the discharge port 201 of the mounting base 2 to the outside.

When the input module 301 detects a fourth manipulation of the user, the air vent apparatus starts to operate, and the air vent apparatus enters the direct blowing mode.

All of the above manipulations are short-time touch manipulations or short-time press manipulations.

In the exemplary embodiment of the present disclosure, after the air vent apparatus starts to operate, the air vent apparatus enters the direct blowing mode.

When the input module 301 detects a first short-time touch manipulation or a first short-time press manipulation of the user, the air vent apparatus enters the circulation mode.

When the input module 301 detects a second short-time touch manipulation or a second short-time press manipulation of the user, the air vent apparatus enters the fixed mode.

When the input module 301 detects a third short-time touch manipulation or a third short-time press manipulation of the user, the air vent apparatus enters the circulation mode again.

In the instant case, as long as the input module 301 detects the short-time touch manipulation or the short-time press manipulation of the user, the air vent apparatus is configured to switch the mode between the circulation mode and the fixed mode.

When the input module 301 detects a long-time touch manipulation or a long-time press manipulation of the user, the air vent apparatus is turned off, and the air guide assembly may block the wind of the air conditioner from being discharged from the discharge port 201 of the mounting base 2 to the outside.

When the input module 301 detects a fourth short-time touch manipulation or a fourth short-time press manipulation of the user, the air vent apparatus starts to operate, and the air vent apparatus enters the direct blowing mode.

When the input module 301 detects the first short-time touch manipulation or the first short-time press manipulation of the user again after the air vent apparatus enters the direct blowing mode, the air vent apparatus enters the circulation mode.

The above-described short-time touch manipulation or short-time press manipulation is set so that a touch time period does not exceed 0.5 S, and the long-time touch manipulation or long-time press manipulation is set so that a pressing time period exceeds 2 S.

It should be understood that the specific time periods of the long-time manipulation and the short-time manipulation described above may be adjusted according to actual conditions.

As illustrated in FIG. 18, the air vent apparatus for the vehicle according to the exemplary embodiment of the present disclosure further includes a display module 302. The display module 302 is provided at or adjacent to the center console, and the display module 302 is electrically connected to the controller. For the user to know a current operation mode of the air vent apparatus, the display module 302 may display the position where the air guide assembly is located.

Figure 19:
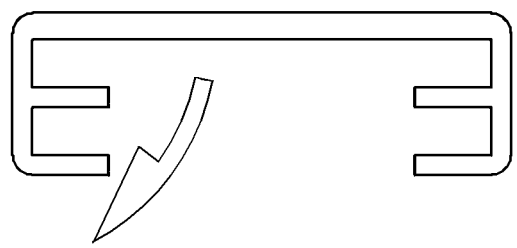
FIG. 19 is an image displayed by a display module when an air guide assembly is in a first position.

When the four guide plates rotate to the position illustrated in FIG. 13 (that is, the first position), an icon displayed on the display module 302 is as illustrated in FIG. 19.

Figure 20:
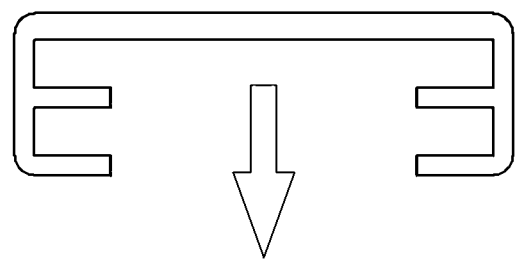
FIG. 20 is an image displayed by a display module when an air guide assembly is in a second position.

When the four guide plates rotate to the position illustrated in FIG. 14 (that is, the second position), an icon displayed on the display module 302 is as illustrated in FIG. 20.

Figure 21:
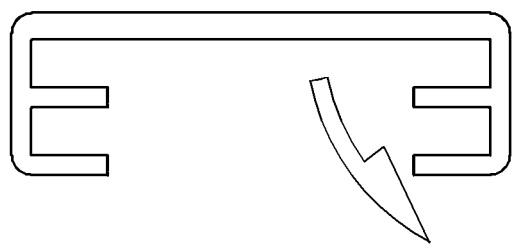
FIG. 21 is an image displayed by a display module when an air guide assembly is in a third position.

When the four guide plates rotate to the position illustrated in FIG. 15 (that is, the third position), an icon displayed on the display module 302 is as illustrated in FIG. 21.

Figure 22:
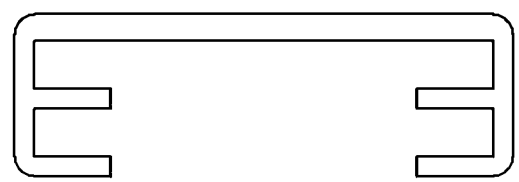
FIG. 22 is an image displayed by a display module when an air guide assembly is in a fourth position.

When the four guide plates rotate to the position illustrated in FIG. 16 (that is, the fourth position), an icon displayed on the display module 302 is as illustrated in FIG. 22.

The air vent apparatus for the vehicle according to the exemplary embodiment of the present disclosure may further include a cover 1, and the cover 1 may cover an upper portion of the mounting base 2.

Another exemplary embodiment of the present disclosure further provides a vehicle provided with the above-described air vent apparatus. As illustrated in FIG. 17, the air vent apparatus is mounted on a portion of a glass located adjacent to an upper end portion of a crash pad (C/PAD) (see FIGS. 17 and 23).

Hereinafter, the manipulation of the air vent apparatus for the vehicle according to the exemplary embodiment of the present disclosure will be described with reference to the drawings.

When all the switchings between the modes are implemented through the short-time manipulations, the operation of the vehicle air vent apparatus is as follows.

After the air conditioner and the air vent apparatus are operated, the air vent apparatus directly enters the direct blowing mode.

When the user performs the short-time touch or the short-time press manipulation on the input module 301 once, the air vent apparatus enters the circulation mode.

When the user performs the second short-time touch or the second short-time press manipulation on the input module 301 once, the air vent apparatus enters the fixed mode. The user may select an appropriate timing to touch or press the input module with reference to the position of the air guide assembly displayed on the display module 302 according to his or her need.

In the case where blowing is not required, when the user performs the third short-time touch or the third short-time press manipulation on the input module 301 once, the air guide assembly rotates to the fourth position, and the air guide assembly may block the wind of the air conditioner from being discharged from the discharge port 201 of the mounting base 2 to the outside.

In the case where blowing is required again, when the user performs the fourth short-time touch or the fourth short-time press manipulation on the input module 301, the air vent apparatus starts to operate, and the air vent apparatus enters the direct blowing mode.

When the modes are switched through a combination of the short-time manipulations and the long-time manipulations, the operation of the vehicle air vent apparatus is as follows.

After the air conditioner and the air vent apparatus are operated, the air vent apparatus directly enters the direct blowing mode.

When the user performs the first short-time touch or the first short-time press manipulation on the input module 301, the air vent apparatus enters the circulation mode.

When the user performs the second short-time touch or the second short-time press manipulation on the input module 301, the air vent apparatus enters the fixed mode. The user may select an appropriate timing to touch or press the input module with reference to the position of the air guide assembly displayed on the display module 302 according to his or her need.

When the user performs the third short-time touch or the third short-time press manipulation on the input module 301, the air vent apparatus enters the circulation mode.

Through this, when the user touches or presses the input module 301 for a short time, the air vent apparatus may be switched between the circulation mode and the fixed mode.

In the case where blowing is not required, when the user touches or presses the input module 301 for a long time, the air vent apparatus is turned off, and the air guide assembly may block the wind of the air conditioner from being discharged from the discharge port 201 of the mounting base 2 to the outside.

In the case where blowing is required again, when the user touches or presses the input module 301 again for a short time, the air vent apparatus starts to operate, and the air vent apparatus enters the direct blowing mode.

In the case where the air vent apparatus is in the direct blowing mode, when the user touches or presses the input module 301 again for a short time, the air vent apparatus enters the circulation mode.

By use of the short-time touch or the short-time press, the switching between the circulation mode and the fixed mode of the air vent apparatus is controlled.

Furthermore, the term related to a control device such as "controller", "control apparatus", "control unit", "control device", "control module", or "server", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An air vent apparatus for a vehicle, the air vent apparatus comprising:
    a controller mounted on a vehicle body;
    a mounting base mounted on the vehicle body and including a discharge port formed at a rear end portion of the mounting base;
    an air guide assembly mounted adjacent to the discharge port of the mounting base; and
    a drive assembly electrically connected to the controller and configured to drive the air guide assembly engaged to the drive assembly to rotate to a first position, a second position, or a third position under a control of the controller,
    wherein, in the first position, the air guide assembly is controlled to guide wind of an air conditioner from the discharge port of the mounting base to a driver's seat of the vehicle,
    in the second position, the air guide assembly is controlled to guide the wind of the air conditioner from the discharge port of the mounting base to a rear seat of the vehicle, and
    in the third position, the air guide assembly is controlled to guide the wind of the air conditioner from the discharge port of the mounting base to a passenger seat of the vehicle,
    wherein the drive assembly includes:
        a driving member including an output shaft;
        a gear shaft including an upper end portion connected to the output shaft of the driving member;
        a first swing arm including a first end portion and a second end portion, wherein a first protruding shaft extending in an upward direction is mounted on an upper surface of the first end portion and is connected to a lower end portion of the gear shaft, and the first swing arm is rotatable about the first protruding shaft by driving of the gear shaft;
        a second swing arm including a second protruding shaft connected upwardly in a center portion of the second swing arm, wherein the second protruding shaft is connected to the second end portion of the first swing arm, and the second swing arm is rotatable about the first protruding shaft by driving of the first swing arm; and
        two third swing arms, each including a first end portion and a second end portion, wherein a third protruding shaft extending in the upward direction is mounted on an upper surface of each first end portion, each second end portion of each third swing arm is connected to a corresponding end portion of the second swing arm, and each third protruding shaft is connected to a lower end portion of a corresponding air guide assembly to drive the corresponding air guide assembly to rotate.

2. The air vent apparatus of claim 1,
    wherein the drive assembly is controlled to drive the air guide assembly to rotate to a fourth position under the control of the controller, and
    wherein, in the fourth position, the air guide assembly blocks the wind of the air conditioner from being discharged from the discharge port of the mounting base to an outside thereof.

3. The air vent apparatus of claim 1, further including an air guide shell,
    wherein the air guide shell is provided with a mounting chamber and first and second air guide chambers, and the first and second air guide chambers are located on left and right sides of the mounting chamber, respectively.

4. The air vent apparatus of claim 1,
    wherein the second swing arm includes a first connection portion and a second connection portion connected to the first connection portion, and
    wherein a longitudinal axis of the first connection portion and a longitudinal axis of the second connection portion are positioned with an obtuse angle therebetween.

5. The air vent apparatus of claim 4, wherein a length of the first connection portion is greater than a length of the second connection portion, so that the two third swing arms are driven to rotate corresponding air guide assemblies at a same angle, respectively.

6. The air vent apparatus of claim 5, wherein each second end portion of each third swing arm is rotatably connected to a distal end of the first connection portion and a distal end of the second connection portion.

7. The air vent apparatus of claim 5, wherein the second protruding shaft of the second swing arm is formed on a junction portion of the first connection portion and the second connection portion.

8. The air vent apparatus of claim 1,
wherein air guide assemblies are set into two groups, and
wherein each group includes:
   a lower fixed rod and an upper fixed rod;
   a plurality of guide plates pivotably connected to the lower fixed rod and the upper fixed rod; and
   a guide plate connecting rod connected to the plurality of guide plates to synchronously rotate the plurality of guide plates, and
wherein the third protruding shaft of each third swing arm is connected to one guide plate of the plurality of guide plates in each group to drive the one guide plate to rotate, and the one guide plate drives remaining guide plates in each group to be synchronously rotated through the guide plate connecting rod.

9. The air vent apparatus of claim 1, further including an air guide shell,
wherein a first position limiting boss and a second position limiting boss are disposed on the air guide shell to limit rotation angles of the first swing arm and the second swing arm.

10. The air vent apparatus of claim 1, wherein the drive assembly drives the air guide assembly to be fixed in one of the first position, the second position, and the third position under the control of the controller.

11. The air vent apparatus of claim 1, wherein the drive assembly drives the air guide assembly to cyclically swing among the first position, the second position, and the third position under the control of the controller.

12. The air vent apparatus of claim 1, further including an input module,
wherein the input module is electrically connected to the controller, and is configured to receive manipulation information of a user and to transmit the manipulation information to the controller.

13. The air vent apparatus of claim 1, further including a display module,
wherein the display module is electrically connected to the controller and displays a position of the air guide assembly.

14. A vehicle provided with the air vent apparatus of claim 1.

* * * * *